UNITED STATES PATENT OFFICE.

THOMAS RICHARDSON, JOHN JAMES LUNDY, AND ROBERT IRVINE, OF ENGLAND, ASSIGNORS TO JOHN H. WINGFIELD, OF MILFORD, CONNECTICUT.

IMPROVEMENT IN THE EXTRACTION AND MANUFACTURE OF OILS FROM VEGETABLE AND ANIMAL SUBSTANCES.

Specification forming part of Letters Patent No. 42,987, dated May 31, 1864; reissue No. 4,630, dated November 7, 1871.

*To all whom it may concern:*

Be it known that THOMAS RICHARDSON, JOHN JAMES LUNDY, and ROBERT IRVINE, of England, did invent certain new and useful Improvements in the Extraction and Manufacture of Oils from Vegetable and Animal Substances, of which the following is a full, clear, and exact description:

This invention consists in the extraction and recovery of oils, grease, and fats from animal and vegetable substances by means of the solvent power contained in the volatile hydrocarbons obtained from American petroleum or its equivalents; such hydrocarbons for the purposes of this invention being required to boil at or below 212° Fahrenheit.

The process comprises the following operations, First, the digestion of the material operated upon with the hydrocarbon used till the solution of the oil, grease, or fat is effected. Second, the withdrawal of the solution from the exhausted material and the separation and recovery of the solvent, by means of distillation, from the oil, grease, or fat extracted.

The process is applicable to the extraction of oils, grease, or fats in all cases where hitherto heat, pressure, or other solvents than the petroleum hydrocarbons have been employed.

In order that this invention may be fully understood, the following description of the manner in which the same may be used or carried into effect is given.

The vegetable or animal substances to be operated upon are introduced into one or a series of vessels capable of being closed or sealed so as to prevent evaporation of the solvent or solvents employed, and these vessels are called extractors. The solvent or solvents, either in a cold or warm state, are then run into the same vessel or vessels and dissolve out or extract the oil by solution from the vegetable or animal substances or materials operated upon. The vessel may be first filled with the vegetable or animal substances and as much of the volatile hydrocarbons then passed into the extractor as that vessel will conveniently hold. After having been allowed to macerate, the solvent or solvents containing the oil or oils in solution are then run off into a separate vessel or closed receiver, and a fresh portion of the solvent or solvents employed is run into the extractors. The second application of the solvent or solvents is generally sufficient to complete the extraction of the oil from the substances operated upon. If necessary, however, further application of the solvent or solvents may be made until the oil is practically extracted from the substances under treatment. The residue remaining in the extractor may be then treated by means of steam or otherwise to expel the solvent or solvents in a state of vapor from the residue, such vapor being condensed with the steam introduced and the solvent or solvents separated, so as to be again used for operating upon fresh portions of the vegetable or animal substances or materials firstly hereinbefore mentioned.

In order to facilitate the operation, the materials to be operated upon and the solvent may be either or both of them warmed previous to or during their use.

In order to separate the oil contained in solution from the solvent the solvents containing the oil in solution may be heated in a separate vessel by means of steam introduced through coils of pipes, which, by heating the mixed solution of solvent and fixed oils, drives off the volatile hydrocarbons or solvents, which, being caused to pass through a coil of pipes surrounded with cold water, are condensed, and may again be used for the purpose of treating fresh portions of vegetable or animal matters or substances, so that the original solvent in this process may be used with only slight loss for repeated operations. In practice it will be found that repeated operations improve the solvent and bring it more nearly to a state of chemical purity.

For extracting the finer kinds of oils, especially such as would be injured by traces of solvent left in them—as, for example, the oils used in food or medicine—hydrocarbons having a boiling point under 160° Fahrenheit are used, while for the coarser oils and fats, such as wool grease, the oils of cotton-waste, and candle and soap stock, the solvent having a boiling point approaching 212° Fahrenheit may be employed.

The solvent found to be suitable for the first case is known in commerce under the name of gasoline, and for the second case petroleum, naphtha, or benzine.

What is claimed as new, and desired to be secured by Letters Patent, is—

1. The extracting and recovering oils from animal and vegetable substances by means of the solvent properties of the volatile hydrocarbons hereinbefore mentioned.

2. The use of gasoline boiling under 160° Fahrenheit as a solvent in the extraction and recovery of oils, fats, and grease from animal and vegetable substances.

3. The use of petroleum, naphtha, or benzine boiling under 212° Fahrenheit for the same purposes.

THOS. RICHARDSON.
JOHN JAMES LUNDY.
ROBERT IRVINE.
By JNO. H. WINGFIELD,
*Assignee.*

Witnesses:
WM. W. STONE,
S. C. STONE.

(35)